United States Patent [19]
Macovski et al.

[11] 3,812,527
[45] May 21, 1974

[54] TWO-DIMENSIONAL FILTERING FOR ENCODED TELEVISION CAMERA

[75] Inventors: Albert Macovski; Louis F. Schaefer, both of Palo Alto, Calif.

[73] Assignee: The United States of America as represented by the Administrator of the National Aeronautics and Space Administration, Washington, D.C.

[22] Filed: Sept. 15, 1972

[21] Appl. No.: 289,653

[52] U.S. Cl. .......... 358/47
[51] Int. Cl. .......... H04n 9/06
[58] Field of Search .......... 178/5.4 R, 5.4 ST

[56] References Cited

UNITED STATES PATENTS

| | | | |
|---|---|---|---|
| 3,548,087 | 12/1970 | Shimada | 178/5.4 ST |
| 3,548,088 | 12/1970 | Shimada et al. | 178/5.4 ST |
| 3,647,943 | 3/1972 | Marshall | 178/5.4 ST |
| 3,719,771 | 3/1973 | Eto et al. | 178/5.4 ST |

*Primary Examiner*—Robert L. Richardson
*Attorney, Agent, or Firm*—Lindenberg, Freilich & Wasserman

[57] ABSTRACT

There has been developed a single camera system capable of providing color television signals. The television camera which is employed utilizes encoding filters consisting of three superimposed line grids, each grid being of a different color and making a different angle with the vertical axis. This invention provides a filtering system whereby encoded carriers, created by two of the line grids which make the same angle but are of opposite sign with the vertical axis, may be reliably separated.

3 Claims, 2 Drawing Figures

TWO-DIMENSIONAL FILTERING FOR ENCODED TELEVISION CAMERA

ORIGIN OF THE INVENTION

The invention described herein was made in the performance of work under a NASA contract and is subject to the provisions of Section 305 of the National Aeronautics and Space Act of 1958, Public Law 85-568, (72 Stat. 435; 42 USC 2457).

BACKGROUND OF THE INVENTION

In patents such as U.S. Pat. No. 3,378,633, entitled "System for Scanning Color Encoded Film with a Monochrome TV Camera", and, U.S. Pat. No. 3,585,286, entitled "Spatial Filter Color Encoding and Image Reproducing Apparatus", there are described single camera color television systems. The camera employs a spatial filter in order to encode the color component signals which are generated by the camera when it scans a scene. The spatial filter comprises parallel line grids or gratings which are of different primary colors, which are superimposed upon one another. These gratings make three different angles with the vertical axis.

Heretofore, electrical filters have been used to separate the various encoded signals. Conventionally, these filters consisted of a band pass circuit which filtered in the $\omega x$ direction and an array of M samples separated by a scanning line which filtered in the $\omega y$ direction. In general, the amplitude response of this system was of the form:

$$|H(\omega_x)| \cdot \left|\sum_m a_m e^{im\omega_y Y}\right|$$

the product of the filter in each dimension. A filter which is of this type, although reasonably flexible, cannot distinguish between two encoded carriers created by two identical gratings which make the same angle but are of opposite sign with respect to the vertical axis. Thus, an encoded carrier, cosine $(\alpha x + \beta y)$ cannot be distinguished from cosine $(\alpha x - \beta y)$. To make fuller use of the available spatial frequency spectrum, a more generalized two-dimensional filter is required.

OBJECTS AND SUMMARY OF THE INVENTION

An object of this invention is to provide an improved filter arrangement for enabling improved separation of encoded color television signals.

Yet another object of this invention is the provision of an improved, generalized, two-dimensional filter.

These and other objects of the invention may be achieved by sampling a matrix of picture elements which are separated by the scan line distance in the vertical direction, and by a picture element distance in the horizontal direction. The samples are derived through resistors which have different weights and then are added together to produce a weighted sum. This weighted sum is then passed through an electrical band pass filter. The filtering arrangement just described allows any grating structure at any angle and periodicity with its associated modulation spectrum to be uniquely separated.

In a second embodiment of the invention, a conventional band pass filter is placed in series with an array of samples separated by a scanning line in the manner described previously. A sample is added to the weighted sum of the samples derived in the manner described previously, and then passed through a succeeding band pass filter. The essential difference here is that the points in the array are given complex values. When the points in the array are allowed to have complex weightings, the amplitude response of this system is no longer of the form $H(\omega_x) \cdot H(\omega_y)$, thus allowing for the separation of cosine $(\alpha x + \beta y)$.

DESCRIPTION OF THE PREFERRED EMBODIMENTS

Figures 1, 2:
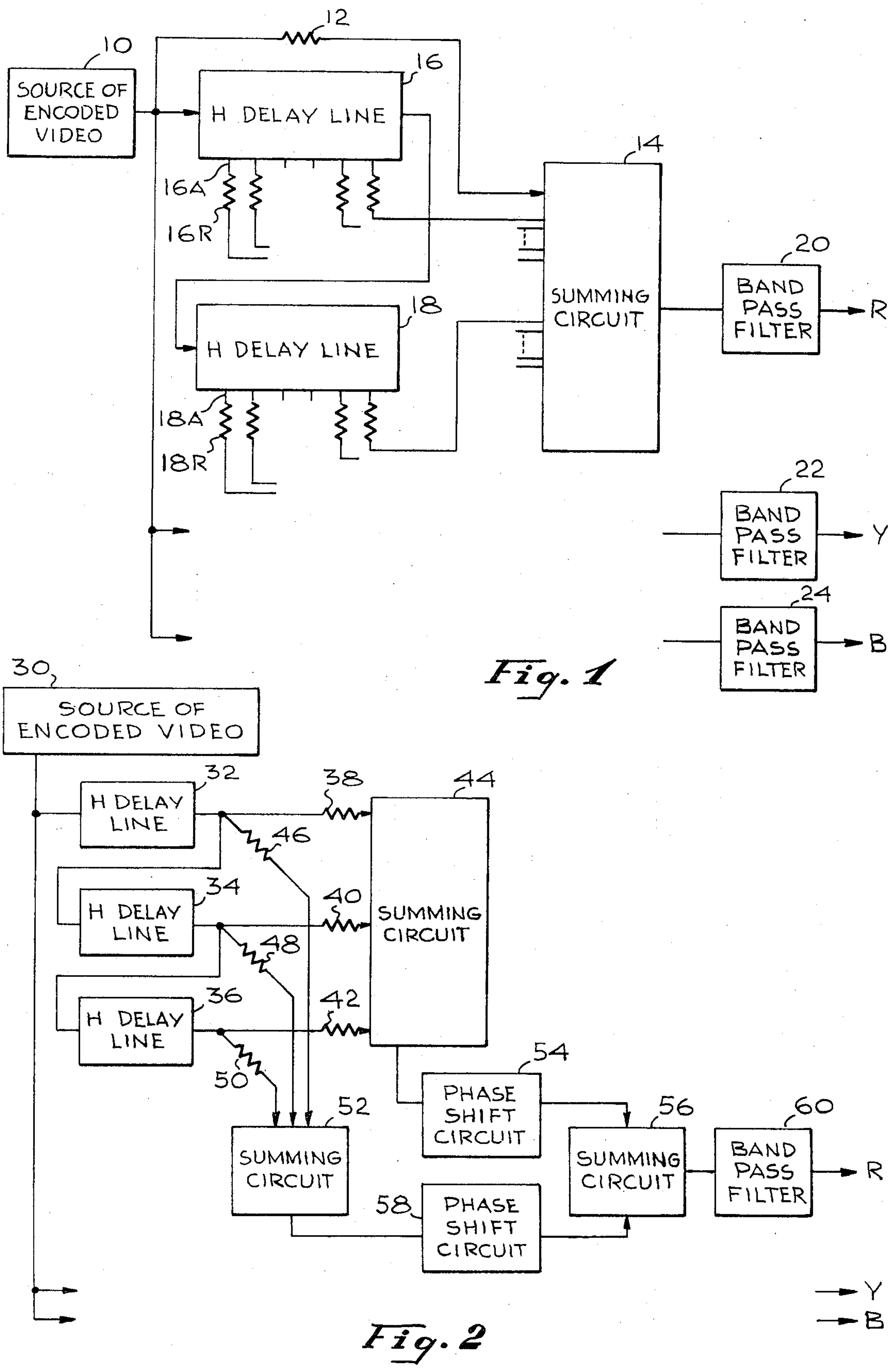
FIG. 1 is a block schematic diagram of an embodiment of the invention.
FIG. 2 is a block schematic diagram of the second embodiment of the invention.

Referring now to FIG. 1, by the "source of encoded video", 10, is intended to mean the signals derived from a color encoding television camera, which scans a scene through a spatial filter or grating of the general type described above. There are three gratings each having its lines of a color different from the lines of the other gratings. As a result, when a scene is scanned through these gratings, three different modulated carriers are generated which may be considered as encoded color carriers. The problem of separation of these color carriers arises when two of the three gratings make the same angle with the vertical axis, except, of course, that one is positive and the other is negative.

For each color carrier to be separated, signals from the source of encoded video are applied through a resistor 12, to a summing circuit 14, as well as to the two-dimensional filter. Each two-dimensional filter includes at least two delay lines respectively. 16 and 18, which provide the delay equal to the interval of a horizontal television line or 63.5 microseconds. Each delay line has taps respectively represented by 16*a*, 18*a*, there being a tap for each picture element along a delay line. Each tap is connected through a weighted resistor respectively 16*r*, 18*r*, to the summing circuit 14.

The summing circuit adds all of the weighted samples derived by the taps connected to the delay lines. The outputs of the summing circuit 14 is then applied to a band pass filter 20, whose output is a color carrier with the modulated signals thereon. The width of the band pass filter is determined by the width of the modulated carrier and side bands desired to be passed. The center frequency of the band pass filter is determined by the frequency of the desired carrier generated by the scanning television camera for the particular color.

As previously indicated, for each encoded color carrier which is to be separated, there is provided a counterpart of the circuitry which was just described except for the respective Y and B band pass filters respectively 22, 24, whose band widths and center frequencies are determined for the Y and B carrier frequencies.

The resultant filter characteristic due to a weighted sum of the outputs of the filter represented in FIG. 1 is given by:

$$G(f_x, f_y) = \sum_n \sum_m a_{mn} \exp 2\pi j[nXf_x - nYf_y]. \quad (1)$$

By setting $a_{mn} = a\text{-}m\text{-}n$ to obtain phase free filters, the weighted sum becomes, $$\sum_{n}\sum_{m} a_{mn} \cos [2\pi(nXf_x+mYf_y)]$$

X is the separation between points in the X direction, $y$ is the separation between points in the $y$ direction, and $a$ is the weight or contribution to be given to a particular line signal. Since $a$ is the weight to be given to a particular signal in the filter, it may also be a resistance value. Thus, $a_{nm}$ is the value of the tapping resistor at the $n$th line and $m$th row.

To determine the resistor values of the filter, first one must determine the desired filter characteristics i.e., bandwidth, center frequency and shape. Call the desired two dimensional frequency response $H(f_x f_y)$. It is now required to find the values $a_{n,m,}$ to approximate the frequency response $H(f_x f_y)$.

First the impulse response $h(x,y)$ of $H(f_x f_y)$ is found by taking the two dimensional Fourier transform of $H(f_x f_y)$. $h(x,y)$ and hence, $H(f_x f_y)$ can be closely approximated if sufficient points in the two dimensional filter are selected and the separation of the points X in the $x$ direction, and Y in the $y$ direction, are small enough. The values for $a(n,m)$ can be found by making $a(nm) = h(x,y)$ where $x = nX$ and $y = mY$.

Finally, if it is desired to see exactly what frequency response is obtained, then substitution of values may be made directly in equation (1).

The two-dimensional filter shown and described, coupled with the electrical band pass filter, allows any grating structure at any angle and periodicity, with its associated modulation spectrum to be uniquely separated. This is because the spacings of the points selected and the weights of the points can be adjusted to provide a variety of two-dimensional filters. These can be made centered at the desired carrier with a bandwidth and skirt selectively limited to the number of points chosen.

FIG. 2 shows another embodiment of the invention. A source of encoded video 30, identical to the source 10, has its output applied to a plurality of series connected horizontal delay lines respectively 32, 34, 36. The output of each horizontal delay line is connected through a weighting resistor respectively 38, 40, 42, to a summing circuit 44. The output of each horizontal delay line is also connected through three additional weighting resistors respectively 46, 48, 50, to a summing circuit 52. The output of the summing circuit 44 is applied through a phase shifting network 54 to the summing circuit 5. The output of the summing circuit 52 is applied to the phase shifting circuit 58. The purpose of the phase shifting circuits 54 and 58 is to differentially phase shift the outputs of the respective summing circuits 44 and 52, by 90° prior to adding in the summing circuit 56.

The output of the summing circuit 56 is applied to a bandpass filter 60, whose output is an amplitude modulated color carrier signal. As above indicated, for each color carrier circuit, as just described, must be duplicated.

The essential difference between the arrangement shown in FIG. 2 and FIG. 1 is that the sample points in the array shown in FIG. 2 are allowed to have complex weightings (i.e. real plus imaginary values), and therefore the amplitude responsive system is no longer of the form $H(\omega y)$, thus allowing for the separation of cosine $(\alpha x + \beta y)$. Comparing this type of filter to the two-dimensional matrix arrangement shown in FIG. 1, the former has better stop band rejection and is cheaper to implement, but is less flexible in terms of realizable transfer functions.

There has accordingly been described and shown a novel and useful filter arrangement for separating encoded color television carrier signals from one another.

What is claimed is:

1. In a color television system of the type which employs a spatial filter for generating encoded color carriers, a filter for separating the color carriers from each other comprising:

a plurality of delay lines connected in series, each delay line providing a delay interval required for a horizontal line of said color television system, means for applying said color encoded carrier signals to a first of said series connected horizontal delay lines, means for deriving weighted signal samples from each of said horizontal delay lines, means for adding said weighted samples to produce a sum signal, and a band pass filter to which said sum signal is applied whereby one of the encoded color carrier signals is provided at the output of said band pass filter.

2. In a color television system as recited in claim 1 wherein said means for deriving a plurality of weighted samples from said horizontal delay line comprises a plurality of taps spaced by a picture element interval at each one of the said delay lines, and weighting resistors connecting each one of said taps to said summing circuit.

3. In a television system as recited in claim 1 wherein said means deriving weighted sample signals from said horizontal delay lines comprises:

a first resistor for each one of said horizontal delay lines connecting the output of each one of said horizontal delay lines to said summing circuit, and a second resistor for each one of said horizontal delay lines connecting each horizontal delay line output to a second summing circuit, a third summing circuit, and equalizing network means connecting the outputs of said first and second summing circuits to said third summing circuit.

* * * * *